(12) United States Patent
Qureshi et al.

(10) Patent No.: US 9,578,395 B1
(45) Date of Patent: Feb. 21, 2017

(54) EMBEDDED MANIFESTS FOR CONTENT STREAMING

(71) Applicant: AMAZON TECHNOLOGIES, INC., Seattle, WA (US)

(72) Inventors: Aneeb Naveed Qureshi, Seattle, WA (US); Maher Alam Beg, Seattle, WA (US); Dan Catalin Teodorescu, Redmond, WA (US); Joshua Gene Slider, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/501,641

(22) Filed: Sep. 30, 2014

(51) Int. Cl.
 *H04N 21/845* (2011.01)
 *H04N 21/437* (2011.01)
 *H04N 21/81* (2011.01)
 *H04N 21/858* (2011.01)
 *H04N 21/239* (2011.01)

(52) U.S. Cl.
 CPC ..... *H04N 21/8455* (2013.01); *H04N 21/2393* (2013.01); *H04N 21/437* (2013.01); *H04N 21/812* (2013.01); *H04N 21/8586* (2013.01)

(58) Field of Classification Search
 CPC .. H04N 21/02; H04N 21/25; H04N 19/00903; H04N 19/002; H04N 19/85; H04N 21/8455; H04N 21/2393; H04N 21/437; H04N 21/812; H04N 21/8586; H04N 21/234309; H04N 21/4363; H04N 21/6408; G06F 15/16
 See application file for complete search history.

(56) References Cited

U.S. PATENT DOCUMENTS

| | | | |
|---|---|---|---|
| 2011/0125919 A1* | 5/2011 | Kwon | H04N 21/23439 709/231 |
| 2014/0013376 A1* | 1/2014 | Xu et al. | 725/116 |
| 2014/0269936 A1* | 9/2014 | Shivadas | H04N 19/46 375/240.26 |
| 2014/0281009 A1* | 9/2014 | Moorthy | G06F 17/30017 709/231 |

* cited by examiner

*Primary Examiner* — Benjamin R Bruckart
*Assistant Examiner* — Susan X Li
(74) *Attorney, Agent, or Firm* — Lindauer Law, PLLC

(57) ABSTRACT

Techniques are described for providing rendition manifests for the playback of video content or other types of content on a user device. The response to a request for content may serially include data objects for one or more rendition manifests as Data Uniform Resource Indicators (URIs) or in another data format. By incorporating the data of the rendition manifest(s) in the response, implementations may forego a network request to retrieve the rendition manifest(s) and thus reduce the latency for presenting content. In some cases, the incorporated rendition manifest(s) may list locations for a subset of chunks of a content file, and the content may be marked as live content, to reduce the size of the response and further reduce latency. In some cases, locations for chunks from multiple content files may be included in a same set of one or more rendition manifests in the response.

20 Claims, 10 Drawing Sheets

EMBEDDED MANIFESTS FOR CONTENT STREAMING

BACKGROUND

As users gain access to faster network connections and computing devices with greater processing power, more users are opting to view video content that is streamed over a network from a streaming service. In some cases, a user may become impatient if a video fails to begin playing soon after it is requested, and the user may choose other streaming services to view the content. Accordingly, delays in video content presentation may lead to lower advertising revenue, lower subscription revenue, a reduced user base, or other adverse consequences.

Figure 1:
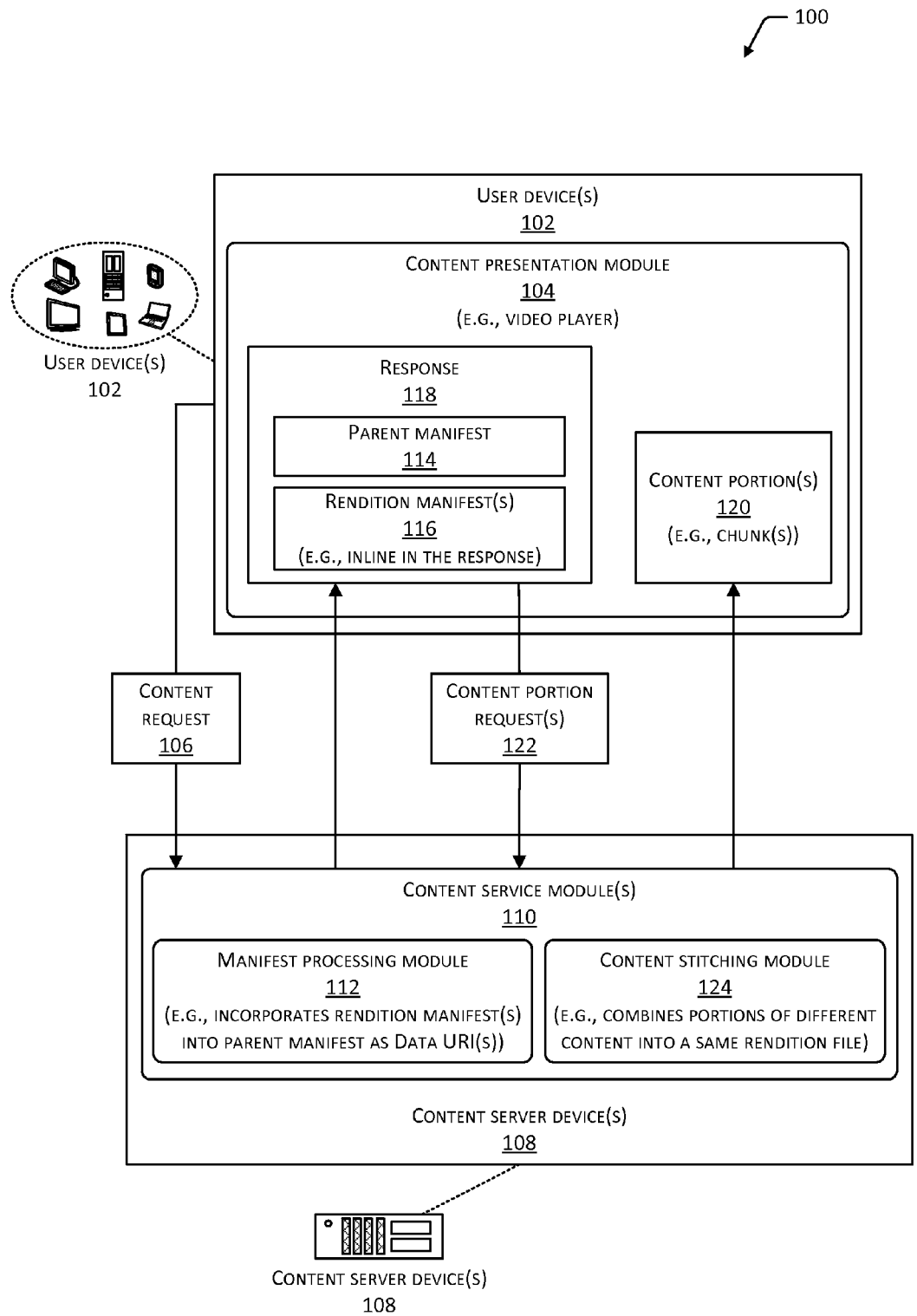
FIG. 1 depicts an environment for incorporating one or more rendition manifests into a response with a parent manifest for content presentation.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for communicating and presenting video content or other types of content on a user device by including a parent manifest and one or more rendition manifests in a response to a request for the video content. Traditional methods for playing video content over the World Wide Web may incorporate progressive streaming techniques. Under traditional techniques, if a user requests that a video play from a particular frame or time, the data for the video file up to the requested frame or time may be downloaded to the user device prior to the beginning of playback. Accordingly, such techniques may lead to a delay in playback over a slow network connection. Hypertext Markup Language 5 (HTML5) added support for byte range requests for video content, enabling faster advancing to any frame of the video content.

Hypertext Transfer Protocol (HTTP) Live Streaming (HLS) provides additional features for video playback. In HLS, a video file is divided into a plurality of portions or segments described as chunks. Such chunks may be transport stream (TS) chunks formatted according to a version of the Moving Picture Experts Group-2 (MPEG-2) format. HLS enables the user to request that the video advance to any frame or point in time, and the video may advance without downloading and buffering all of the previous data in the video file. HLS also enables the video player on the user device to change the quality of the video based on the speed or quality of the network connection to a content server. For video streaming according to HLS, the user requests the video from a Uniform Resource Locator (URL) that is a network location of a parent manifest file. The parent manifest file lists network locations of a plurality of rendition manifest files corresponding to different bit rates for network communication. Each of the rendition manifest files includes a list of URLs that provide the network locations for playable chunks of the video file, the chunks arranged to be suitable for network communication according to the bit rate. For example, a rendition manifest file for a slow bit rate may list locations of chunks that are smaller or that include lower resolution video content. A rendition manifest file for a faster bit rate may list locations of chunks that are larger or that include higher resolution video content.

When the video player on the user device detects a degradation in network quality, the video player may select a lower bit rate rendition manifest file to use in retrieving chunks of the video. When the video player detects an improvement in network quality, the video player may select a higher bit rate rendition manifest file to use in retrieving the chunks. Accordingly, HLS may enable uninterrupted video playback under varying network conditions, with the highest quality video that is feasible given current network conditions.

Under traditional HLS, a video player may initially request the master manifest file and may then request one or more rendition manifest files from the URL(s) indicated in the master manifest file. In many cases, the video player may request all the rendition manifest files listed in the master manifest file, to enable switching between bit rates as the network quality changes. After receiving the rendition manifest file(s), the video player may request a first chunk of the video content from a URL listed in one of the rendition manifest files. Accordingly, traditional HLS may involve at least three network requests—for the master manifest file, at least one rendition manifest file, and the first chunk of video content—before the video content may begin playing on the video player. The multiple network requests may lead to a delay in presentation of the video content, and may consequently lead to a negative user experience.

Implementations reduce the delay in presentation of video content by incorporating the contents of one or more of the rendition manifests into the response to the request for content, thus avoiding one or more network requests to retrieve the rendition manifest files separately from network locations listed in the parent manifest file. In some implementations, the rendition manifest(s) may be incorporated into the response through use of one or more Data Uniform Resource Indicators (URIs) such as the Data URIs supported in HTML5. Such Data URI(s) may comply with the format described in Internet Engineering Task Force (IETF) Request for Comment (RFC) 2397. Implementations also support other means for incorporating the rendition manifest(s) in the response, such as embedding the rendition manifest(s) as JavaScript™ Standard Object Notation (JSON) object(s) according to a version of the JSON format that complies with IETF RFC 7159. The rendition manifest(s) may also be incorporated as image(s) in the markup language of the response, or incorporated as other types of data objects. Under a test scenario, embedding the rendition manifest(s) as Data URI(s) in the response reduced the time to first frame (e.g., the delay in the start of video playback) from approximately 10 seconds to approximately 2.4 seconds. Reduction in the time to first frame may lead to a more positive user experience and thus to a larger user base, higher advertising revenues, higher subscription revenues, and so forth.

Although the examples herein describe facilitating video content presentation through the incorporation of rendition manifests into a response, implementations are not so limited. Implementations also support the presentation of other types of content such as audio content, interactive (e.g., game) content, and so forth. Video content may include animation or graphics content.

FIG. 1 depicts an environment 100 in which implementations may operate. As shown in FIG. 1, the environment 100 may include one or more user devices 102. The user device(s) 102 may comprise any type of computing device, including but not limited to a personal computer, a smartphone, a tablet computer, a wearable computer, an implanted computer, a mobile gaming device, an e-book reader, an automotive computer, a desktop computer, a laptop computer, a game console, a home entertainment device, a network computer, a server computer, a mainframe computer, a distributed computing device (e.g., a cloud server), and so forth. Although examples herein may describe the user device(s) 102 as physical device(s), implementations are not so limited. In some cases, the user device(s) 102 may include one or more of a virtual computing environment, a hypervisor, a device emulation, or a virtual machine executing on one or more physical computing devices. In some cases, two or more of the user devices 102 may comprise a cluster, cloud, farm, or other grouping of multiple devices that coordinate operations to provide load balancing, failover support, parallel processing capabilities, shared storage resources, or other aspects. The user device(s) 102 are described further with reference to FIG. 5.

The user device(s) 102 may execute a content presentation module 104 for presenting content such as video content. In some cases, the content presentation module 104 may include a version of the Flash™ player provided by Adobe Systems of San Jose, Calif., United States, or a version of the Silverlight™ player provided by Microsoft Corporation of Redmond, Wash., United States. Implementations also support other content presentation modules 104. In some cases, the content presentation module 104 may execute within a web browser configured to present web pages that are described at least in part using a markup language such as a version of HTML. Implementations support the use of any web browser, including but not limited to one or more of the following: Mozilla Firefox™; Microsoft Internet Explorer™; Google Chrome™; Apple Safari™; Rockmelt™; and so forth. Implementations also support the use of a web browser, such as the Amazon Silk™ browser, in which the processing of content is performed partly on the user device 102 and partly on other computing device(s) such as content server device(s). In cases where the rendition manifest(s) are incorporated into the response as Data URI(s), the web browser may support HTML5. In some implementations, the content presentation module 104 may execute in other types of applications other than web browsers, such as a native application configured to execute on the user device 102.

A user of the user device 102 may employ the content presentation module 104, a web browser, or other application to generate a content request 106. The content request 106 may request a video file or other content to be presented in the content presentation module 104. In some cases, the content request 106 may identify a network address, location, or name of a parent manifest corresponding to video content. For example, the content request 106 may include a URI such as a URL or a Uniform Resource Name (URN). The content request 106 may also include other information, such as one or more parameters, cookies, and so forth. In some cases, the content request 106 may be a HTTP request such as a GET, POST, PUT, or other types of requests.

The content request 106 may be communicated over one or more networks to one or more content server device(s) 108. The content server device(s) 108 may comprise any type of computing device(s), including but not limited to those types of devices described with reference to the user device(s) 102. Although examples herein may describe the content server device(s) 108 as physical device(s), implementations are not so limited. In some cases, the content server device(s) 108 may include one or more of a virtual computing environment, a hypervisor, a device emulation, or a virtual machine executing on one or more physical computing devices. In some cases, two or more of the content server devices 108 may comprise a cluster, cloud, farm, or other grouping of multiple devices that coordinate operations to provide load balancing, failover support, parallel processing capabilities, shared storage resources, or other aspects. The content server device(s) 108 are described further with reference to FIG. 6.

The content server device(s) 108 may execute one or more content service modules 110. The content service module(s) 110 may receive the content request 106 from the user device(s) 102. In some implementations, the content service module(s) 110 may include a manifest processing module 112. The manifest processing module 112 may determine a parent manifest 114 corresponding to the content requested in the content request 106. In implementations that employ HLS, the parent manifest 114 may be the HLS master manifest. The manifest processing module 112 may also determine one or more rendition manifests files for the requested content, each of the rendition manifest file(s) including a rendition manifest 116. In some implementations, one or more of the parent manifest 114 or the rendition manifest(s) 116 may be formatted according to a version of the HLS protocol as at least described in the Internet Draft dated Apr. 16, 2014 from Apple, Inc., of Cupertino, Calif., United States, or later versions. Implementations also support other formats for one or more of the parent manifest 114 or the rendition manifest(s) 116, such as the Dynamic Adaptive Streaming over HTTP (MPEG-DASH) format as at least described in the International Organization for Standardization/International Electrotechnical Commission (ISO/IEC) 23009-1:2012 standard published in April 2012, or later versions.

The manifest processing module 112 may modify the parent manifest 114 to replace the URL(s) of one or more rendition manifest files with one or more references to rendition manifest(s) 116 that are included in a response 118. The rendition manifest(s) 116 may be included as data object(s) in the response 118, and each of the referenced data object(s) in the response 118 may include the contents of a rendition manifest 116. The manifest processing module 112 may incorporate one or more rendition manifests 116 into the response 118 with the parent manifest 114 that is communicated to the user device 102 in response to the content request 106.

The rendition manifest(s) 116 may be incorporated inline into the response 118. Inline incorporation may include incorporating the data (e.g., the contents) of the rendition manifest(s) 116 into the response 118, in contrast to traditional HLS in which the response 118 includes a parent manifest 114 listing network locations (e.g., URLs) of the rendition manifest files. The rendition manifest(s) 116 may be incorporated into the response 118 as Data URI(s), JSON object(s), or other data types. The rendition manifest(s) 116 may also be incorporated into the response 118 as image(s) in any format, including but not limited to any version of the Joint Photographic Experts Group (JPEG) format, the Graphics Interchange Format (GIF), the Bitmap (BMP) image file format, and so forth. In some cases, the rendition manifest(s) 116 may be incorporated as section(s) of character data (CDATA) in the response 118. An example of the response 118, including the parent manifest 114 and one or more rendition manifests 116, is described with reference to FIG. 2.

The response 118 including the parent manifest 114 and the rendition manifest(s) 116 is communicated to the user device 102 and accessed by the content presentation module 104. The content presentation module 104 may then access one of the rendition manifests 116 and determine the location (e.g., the URL) of one or more content portions 120 such as chunks of video content. The content presentation module 104 may generate and send one or more content portion requests 122 to the location(s) of the content portion(s) 120. The content portion request(s) 122 may be communicated to the content service module(s) 110 on the content server device(s) 108. The content service module(s) 110 may send the content portion(s) 120 to the user device 102 in response to the content portion request(s) 122. In some cases, the content portion request(s) 122 may be sent to a same set of content server device(s) 108 as the initial content request 106. Alternatively, the content portion request(s) 122 may be sent to a different set of content server device(s) 108 as the initial content request 106. The content portion(s) 120 may be communicated to the user device 102 from any number of content server devices 108.

On receiving the content portion(s) 120, the content presentation module 104 may cause the content portion(s) 120 to be presented (e.g., played) on a presentation device (e.g., a display) that is associated with the user device 102. In some cases, the presentation device may be incorporated into the user device 102. Alternatively, the presentation device may be at least partly external to, or peripheral with respect to, the user device 102. The content portion(s) 120 may comprise audio, video, audio-visual, or multimedia content files in any format, such as a version of the Waveform Audio File Format (WAV), the AU file format, the Moving Picture Experts Group (MPEG) formats such as MPEG-1, MPEG-2, MP3, MPEG-4, or MPEG-DASH formats, the Audio Video Interleave (AVI) format, and so forth. The content portion(s) 120 may also include interactive or graphics content, such as interactive games, widgets, controls, or any form of animation in any format, such as the Flash™ format provided by Adobe Systems of San Jose, Calif., United States. In some cases, the content portion(s) 120 may be MPEG-2 TS chunks. The content portion(s) 120 may include any amount of data. For example, the content portion(s) 120 may include 10 seconds of video content. The communication and presentation of content through incorporation of the rendition manifest(s) 116 into the response 118 is described further with reference to FIG. 7.

In some implementations, the content presentation module 104 may be executed on the user device 102, such as loaded in a web browser, prior to generation of the content request 106. Alternatively, the content presentation module 104 may be loaded at least partly contemporaneously with (e.g., in parallel with) the accessing of the rendition manifest(s) 116 and the sending of the content portion request(s) 122, to avoid added latency in loading the content presentation module 104.

Implementations may also employ other techniques to reduce latency in communicating the parent manifest 114 and presenting the content. In some cases, instead of including all the rendition manifests 116 inline in the response 118, one or more of the rendition manifests 116 may be selected for inclusion in the response 118. For example, one rendition manifest 116 corresponding to a bit rate for a current network quality may be incorporated into the response 118. In some cases, the rendition manifests 116 for the bit rates immediately above and below the current bit rate may also be incorporated into the response 118. In some cases, the parent manifest 114 or a rendition manifest 116 may include an indication that the content is a live stream, even in cases where the content is already complete and available to be served from the content server device(s) 108. In such cases, the locations of a subset of the content portions 120 for a particular content file may be included in the rendition manifest(s) 116, thus reducing the size of the rendition manifest(s) 116 included in the response 118 and reducing latency in communicating the response 118 and beginning content presentation. Implementations in which the content is indicated as a live stream are described further with reference to FIGS. 4, 9, and 10.

In some implementations, one or more content files may be combined (e.g., stitched together) in a single parent manifest 114 and set of rendition manifest(s) 116 sent in the response 118 to the user device 102. For example, a first video content file such as an advertisement may be described with a second video content file such as a television episode, film, short film movie trailer, music video, and so forth. Implementations may combine multiple content files by including the locations for the content portions 120 in a same rendition manifest 116 for a particular bit rate. Such content stitching may be performed by a content stitching module 124 included in the content service module(s) 110, and is described further with reference to FIGS. 3 and 8.

In some implementations, generation of the response 118 and the parent manifest 114 to include internal references to the rendition manifest(s) 116 may be performed dynamically or in real time with respect to the receipt and processing of the content request 106 on the content service module(s) 110. Dynamic operations may be launched within a same execution path, or synchronously with, another process. For example, the operations performed by the content service module(s) 110 (or its component module(s)) to process the content request 106 may include operations for generating the parent manifest 114 to include internal references to data object(s) that include the contents of the rendition manifest(s) 116 in the response 118. In some cases, the operations to process the content request 106 may spawn child processes, threads, or operations for generating the parent manifest 114 to include the internal references to the rendition manifest(s) 116. In either case, the generation of the response 118 and the parent manifest 114 may be performed synchronously with, or within a same execution path as, the receipt and processing of the content request 106. Moreover, in some cases the generation of the response 118 and the parent manifest 114 may be performed in real time with respect to the receipt and processing of the content request 106. For example, the generation of the response 118 and the parent manifest 114 may be performed within a predetermined (e.g., brief) time period relative to the receipt of the content request 106.

In some implementations, the generating of the response 118 to embed the rendition manifest(s) 116 inline in the response 118 may be performed via static operations that are offline or asynchronous with respect to the receipt of the content request 106. For example, the response 118 may be generated at a time prior to the receipt of the content request 106. The response 118 may then be stored until it is retrieved from storage and sent to the user device 102 in response to the content request 106.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, the communications between the various devices in the environment 100 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol. Implementations support the use of any Digital Rights Management (DRM) techniques for controlling access to the content. Modules may include any executable process, program, application, thread, library, or other software.

In some cases, the communications between the user device 102 and the content server device(s) 108 may employ a version of HTTP or HTTP Secure (HTTS), such that the content request 106 is a HTTP request and the response 118 is a HTTP response. Implementations also support other protocols for communications between the user device 102 and the content server device(s) 108, such as a version of the WebSocket protocol such as that described in IETF RFC 6455 dated December 2011. In some implementations, communications between the user device 102 and the content server device(s) 108 may employ a multichannel multiplexed communication protocol such as any version of SPDY™ provided by Google, Inc., of Mountain View, Calif., United States.

Figure 2:
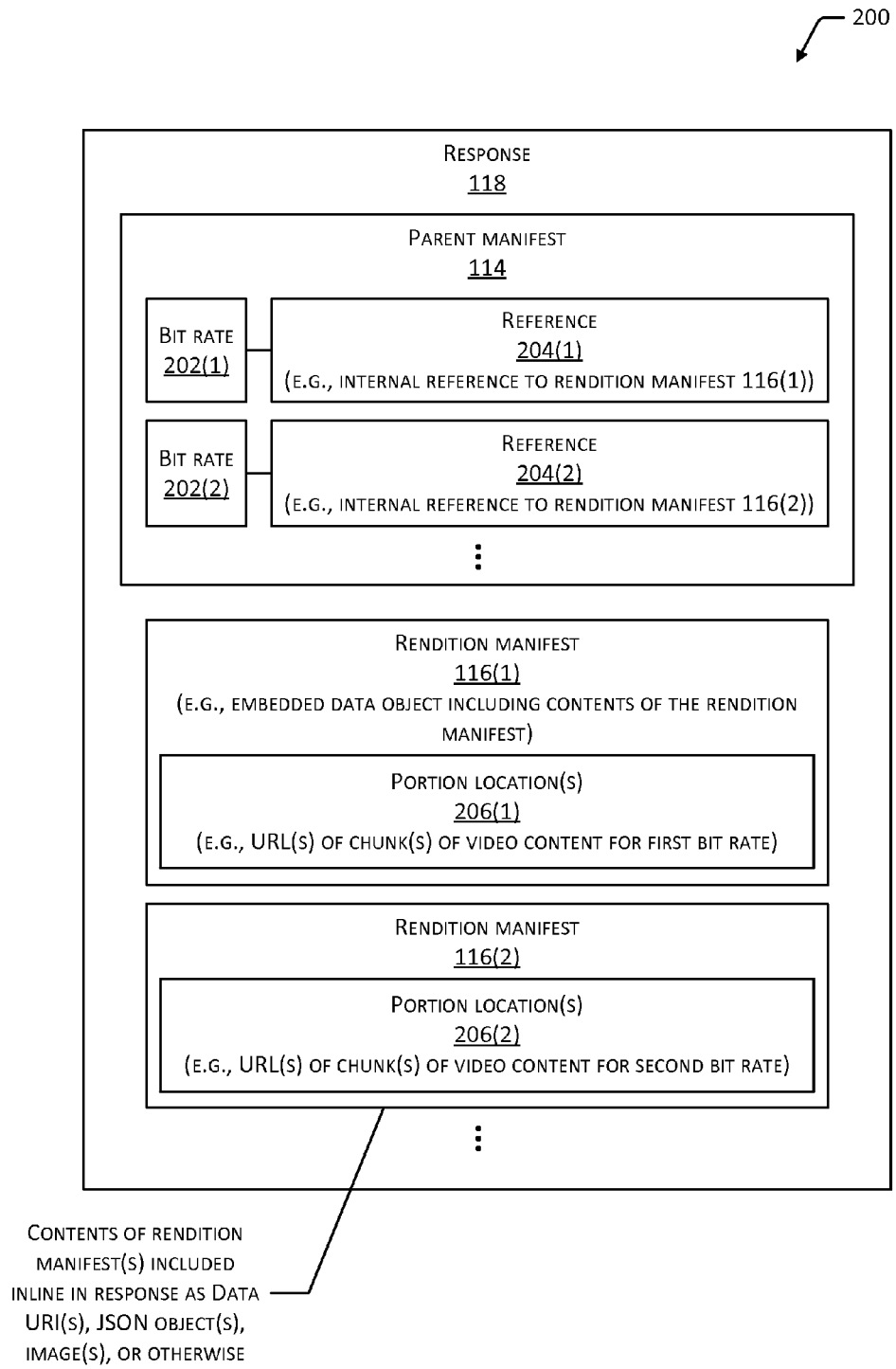
FIG. 2 depicts an example of a response that includes inline the contents of one or more rendition manifests, each rendition manifest describing the locations of portions of playable content.

FIG. 2 depicts an example 200 of a response 118 including data object(s) comprising the contents of one or more rendition manifests 116. As shown in FIG. 2, the parent manifest 114 may include one or more references 204. Each reference 204 may be an internal reference to a data object that is included inline in the response 118 and that includes the contents of a rendition manifest 116. A reference 204 may include metadata identifying the embedded data object that includes the contents of the rendition manifest 116. For example, a reference 204 may include a "data" attribute in a metadata tag to indicate a Data URI that includes the contents of the rendition manifest 116.

In the parent manifest 114, each reference 204 to a rendition manifest 116 may be associated with a bit rate 202, indicating that the rendition manifest 116 is recommended for use under network conditions corresponding to the associated bit rate 202. The data object that includes the contents of the rendition manifest 116 may include one or more portion locations 206 of content portion(s) 120 configured for communication via the associated bit rate 202. For example, the content portion(s) 120 for a slower bit rate 202 may be at a lower resolution compared to the content portion(s) 120 for a higher bit rate 202.

In some implementations, the rendition manifest(s) 116 may be incorporated into the response 118 as serialized data object(s), and the reference(s) 204 may indicate (e.g., point to) the serialized data object(s) embedded in the response 118. A serialized data object may include any amount of data that is a translation of the data of a rendition manifest 116 in a particular format. Serialization may be ordered, such that the data of the data object may be read in the order in which it is embedded in the response 118 to extract or otherwise determine the rendition manifest 116 from the response 118. In some cases, the format of the data object including a rendition manifest 116 may be plain text, such that the contents of the rendition manifest file that originally included the rendition manifest 116 may be embedded in the response 118.

In some implementations, the portion location(s) 206 may be network locations such as URLs of the content portion(s) 120. Implementations also support serializing or otherwise incorporating the data of one or more of the content portions 120 into the response 118. For example, the response 118 may include a rendition manifest 116 as a Data URI, and the rendition manifest 116 may include one or more references 204 to content portion(s) 120 (e.g., chunks) that are also included as Data URI(s) in the response 118. By embedding the content portion(s) 120 into the response 118, some implementations may avoid the additional network request for the content portion(s) 120 and further reduce the latency of content presentation. In some implementations, the data of one or more first content portion(s) 120 (e.g., chunks) of the content may be incorporated inline in the response 118 to reduce the time to first frame during content presentation. Implementations support the use of any method for incorporating the rendition manifest(s) 116, or the content portion(s) 120, into the response 118. Such methods may include the use of Data URIs, JSON objects, images, or other data types.

Figure 3:
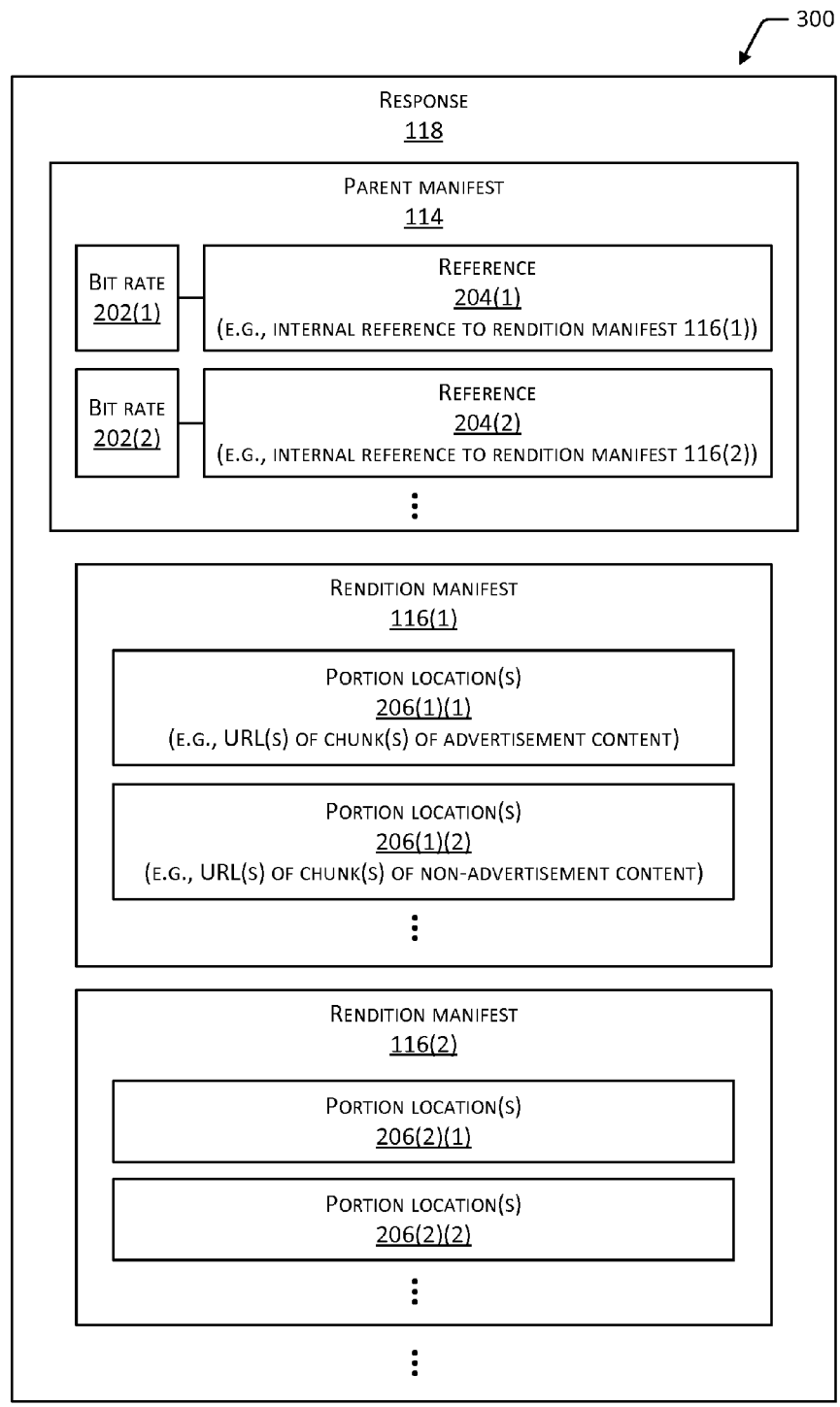
FIG. 3 depicts an example of a response including one or more rendition manifests, each rendition manifest describing locations of portions of playable content from multiple content files.

FIG. 3 depicts an example 300 of a response 118 including data object(s) comprising the contents of one or more rendition manifests 116. In the example of FIG. 3, one or more of the rendition manifests 116 may describe the portion locations 206 of content portions 120 from different content files. For example, a rendition manifest 116(1) may include a first list of portion location(s) 206(1)(1) of content portions 120 of a first video file such as an advertisement. The rendition manifest 116(1) may also include a second list of portion location(s) 206(1)(2) of content portions 120 of a second (e.g., primary content) video file such as a movie, television show, music video, movie trailer, sporting event, instructional video, and so forth. The rendition manifest 116(1) may not distinguish between the portion location(s) 206(1)(1) and the portion location(s) 206(1)(2). Accordingly, the content presentation module 104 may interpret both sets of portion location(s) 206 as being associated with a same content file.

Implementations support the combination (e.g., stitching) of any number of content files in this manner for delivery to the user device 102 and presentation in any order. For example, the rendition manifest(s) 116 may describe content portion(s) 120 for a first advertisement, followed by a first segment of primary content, followed by a second advertisement, followed by a second segment of primary content, and so forth. The incorporation of portion locations 206 for multiple content files in a same parent manifest 114 is described further with reference to FIG. 8.

Figure 4:
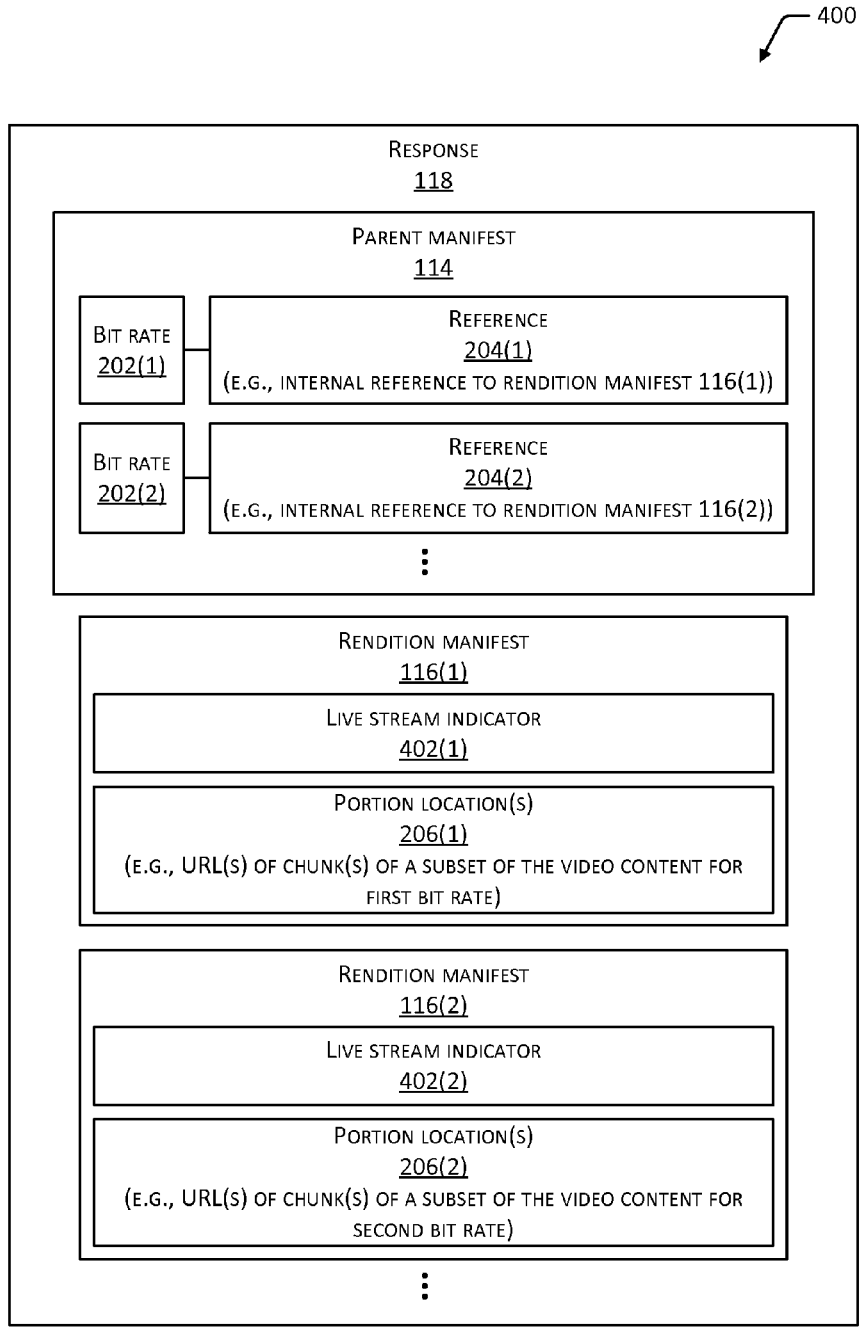
FIG. 4 depicts an example of a response including one or more rendition manifests and an indication that the content is a live stream, each rendition manifest describing locations of a subset of portions of playable content of a content file.

FIG. 4 depicts an example 400 of a response 118 including one or more rendition manifests 116. In the example of FIG. 4, one or more embedded rendition manifests 116 may include a live stream indicator 402 indicating that the content is a live stream. The rendition manifest(s) 116 tagged as live content may describe the portion locations 206 of a subset of the content portions 120 of a content file. By including the portion locations 206 of a subset of the content portions 120 of a content file in the rendition manifest(s) 116, implementations may reduce the size of the parent manifest 114 and thus reduce the latency of communicating the response 118 to the user device 102 and beginning content presentation. In some implementations, the live stream indicator 402 may be included in the parent manifest 114 in addition to, or instead of, being included in the rendition manifest(s) 116. In some cases, one or more of the rendition manifest(s) 116 may include the live stream indicator 402, and other rendition manifest(s) 116 may not include the live stream indicator 402. The rendition manifest(s) 116 that include the live stream indicator 402 may not include an end tag, a duration, or other information indicating an end of the content stream.

By including the live stream indicator 402 in the rendition manifest(s) 116 or the parent manifest 114, the content service module(s) 110 may indicate that the content presentation module 104 is to request additional parent manifest(s) 114 after presenting at least some of the content portions 120 of the content file, in the way that the content presentation module 104 would request additional content portions 120 of a live stream. The use of the live stream indicator 402 to reduce the size of the response 118, and thus reduce latency, is described further with reference to FIGS. 9 and 10.

Figure 5:
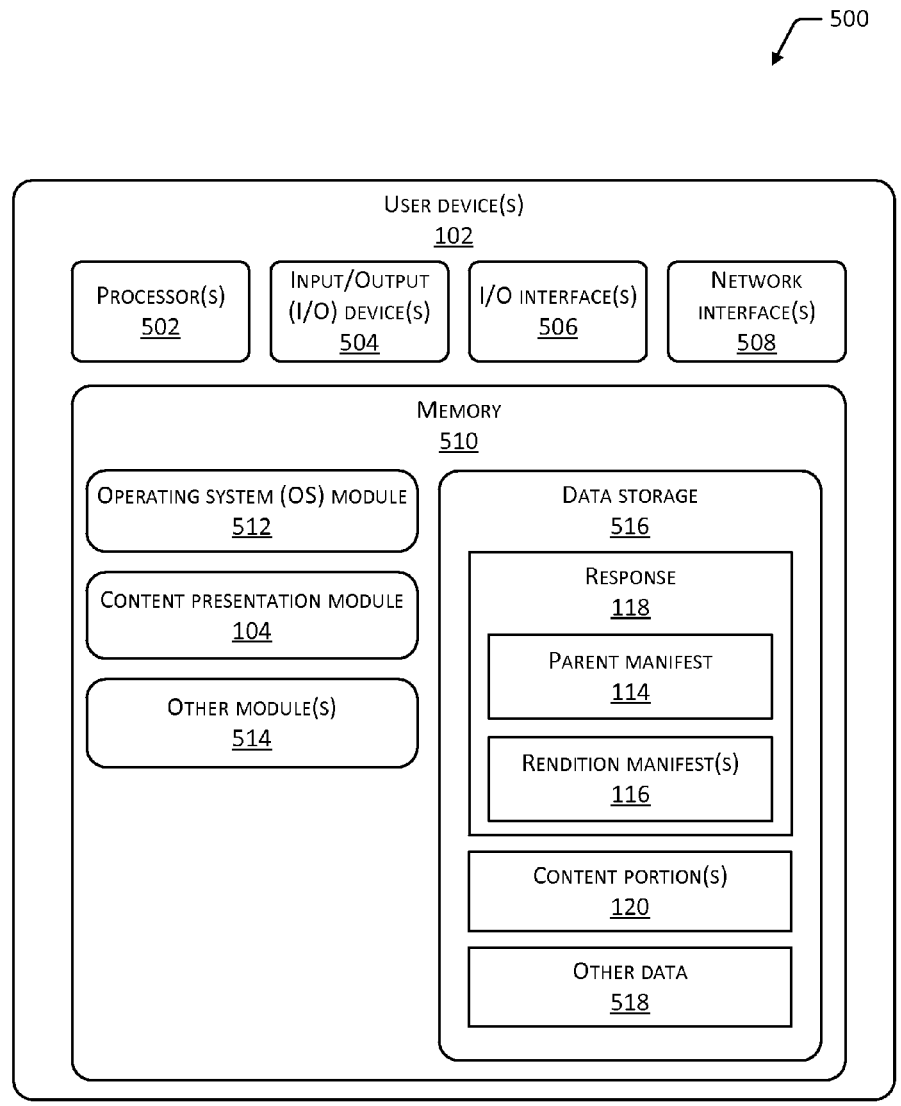
FIG. 5 depicts a block diagram of an example of user device(s) configured to present content.

FIG. 5 depicts a block diagram 500 of an example of the user device(s) 102. As shown in the block diagram 500, the user device(s) 102 may include one or more processors 502 (e.g., hardware-based processor(s)) configured to execute one or more stored instructions. The processor(s) 502 may comprise one or more cores.

The user device(s) 102 may include one or more input/output (I/O) devices 504. The I/O device(s) 504 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 504 may also include output devices such as a display, an audio output device (e.g., a speaker), a printer, a haptic output device, and so forth. The I/O device(s) 504 may be physically incorporated with the user device(s) 102 or may be externally placed.

The user device(s) 102 may include one or more I/O interfaces 506 to enable components or modules of the user device(s) 102 to control, interface with, or otherwise communicate with the I/O device(s) 504. The I/O interface(s) 506 may enable information to be transferred in or out of the user device(s) 102 or between components of the user device(s) 102, through serial communication, parallel communication, or other types of communication. For example, the I/O interface(s) 506 may comply with a version of the RS-232 standard for serial ports, or with a version of the Institute of Electrical and Electronics Engineers (IEEE) 1284 standard for parallel ports. As another example, the I/O interface(s) 506 may be configured to provide a connection over Universal Serial Bus (USB) or Ethernet. In some cases, the I/O interface(s) 506 may be configured to provide a serial connection that is compliant with a version of the IEEE 1394 standard. The user device(s) 102 may also include one or more busses or other internal communications hardware or software that allow for the transfer of data between the various modules and components of the user device(s) 102.

The user device(s) 102 may include one or more network interfaces 508 that enable communications between the user device(s) 102 and other network accessible computing devices, such as the content server device(s) 108. The network interface(s) 508 may include one or more network interface controllers (NICs) or other types of transceiver devices configured to send and receive communications over a network.

The user device(s) 102 may include one or more memories, described herein as memory 510. The memory 510 comprises one or more computer-readable storage media (CRSM). The CRSM may include one or more of an electronic storage medium, a magnetic storage medium, an optical storage medium, a quantum storage medium, a mechanical computer storage medium, and so forth. The memory 510 provides storage of computer-readable instructions that may describe data structures, program modules, processes, applications, or other data for the operation of the user device(s) 102. In some implementations, the memory 510 may provide storage of computer-readable instructions or other information in a non-transitory format.

The memory 510 may include an operating system (OS) module 512. The OS module 512 may be configured to manage hardware resources such as the I/O device(s) 504, the I/O interface(s) 506, and the network interface(s) 508. The OS module 512 may also be configured to provide various services to applications, processes, or modules executing on the processor(s) 502. The OS module 512 may include one or more of the following: any version of the Linux™ operating system; any version of iOS™ from Apple Corp. of Cupertino, Calif., USA; any version of Windows' or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The memory 510 may include one or more of the modules described above as executing on the user device(s) 102, such as the content presentation module 104 described above. The memory 510 may also include one or more other modules 514, such as a user authentication module or an access control module to secure access to the user device(s) 102, and so forth.

The memory 510 may include data storage 516 to store data for operations of the user device(s) 102. The data storage 516 may comprise a database, array, structured list, tree, or other data structure, and may be a relational or a non-relational datastore. The data storage 516 may store any of the types of data described above as being present on the user device(s) 102, including but not limited to the response 118, the parent manifest 114, the rendition manifest(s) 116, or the content portion(s) 120. The data storage 516 may also store other data 518 such as user authentication information, access control data, or other information. In some implementations, at least a portion of the information stored in the data storage 516 may be stored externally to the user device(s) 102, on other devices that may communicate with the user device(s) 102 via the I/O interface(s) 506 or via the network interface(s) 508.

Figure 6:
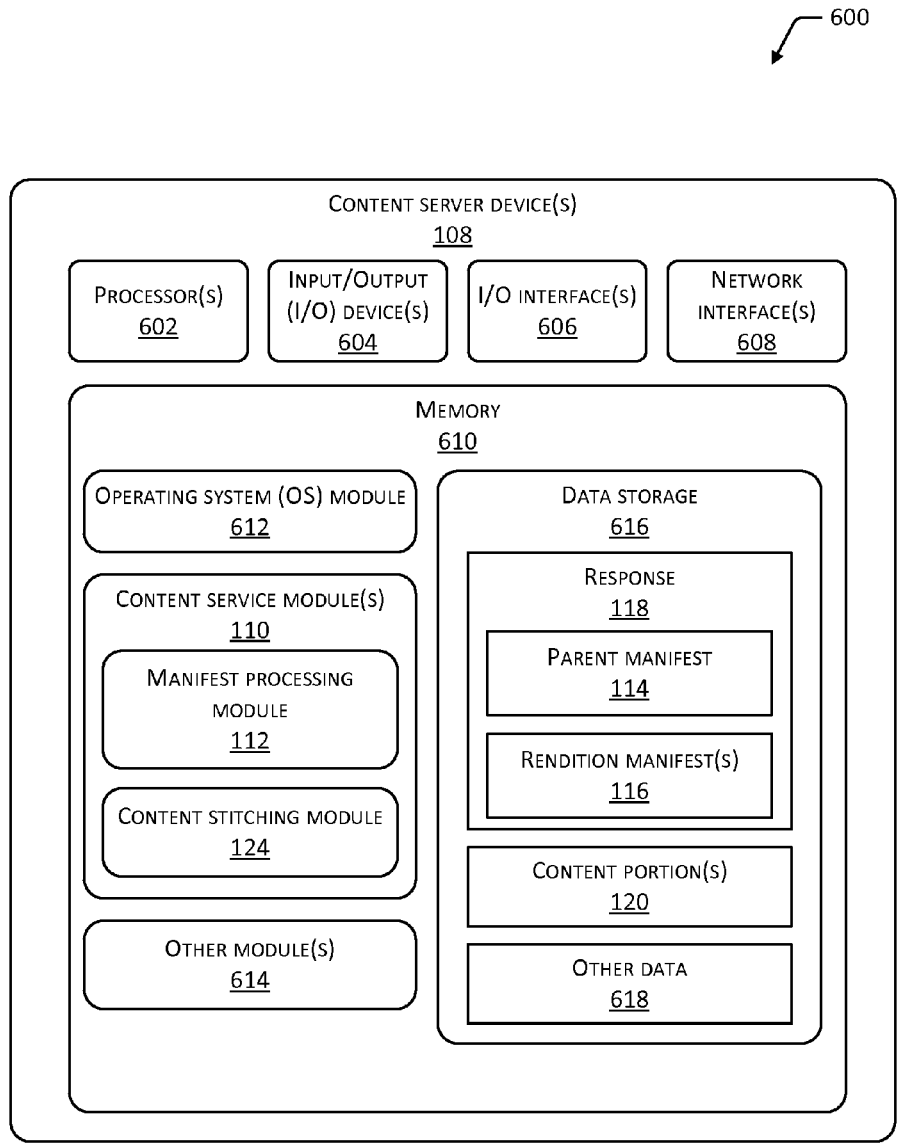
FIG. 6 depicts a block diagram of an example of content server device(s) configured to provide portions of content and a response that includes inline the contents of one or more rendition manifests.

FIG. 6 depicts a block diagram 600 of an example of the content server device(s) 108. As shown in the block diagram 600, the content server device(s) 108 may include one or more processors 602 (e.g., hardware-based processor(s)) configured to execute one or more stored instructions. The processor(s) 602 may comprise one or more cores. The content server device(s) 108 may include one or more I/O devices 604, one or more I/O interfaces 606, and one or more network interfaces 608 as described above respectively with reference to the I/O device(s) 504, the I/O interface(s) 506, and the network interface(s) 508.

The content server device(s) 108 may include one or more memories, described as memory 610. The memory 610 comprises one or more CRSM, as described above with reference to the memory 510. The memory 610 may include an OS module 612 that is configured to manage hardware resources such as the I/O device(s) 604, the I/O interface(s) 606, and the network interface(s) 608, and to provide various services to applications, processes, or modules executing on the processor(s) 602. The OS module 612 may include one or more of the operating systems described above with reference to the OS module 512. The memory 610 may include one or more of the modules described above as executing on the content server device(s) 108, such as the content service module(s) 110, the manifest processing module 112, or the content stitching module 124. Although the manifest processing module 112 and the content stitching module 124 may be depicted as components of the content service module(s) 110, in some implementations one or both of the manifest processing module 112 or the content stitching module 124 may execute as a separate module relative to the content service module(s) 110. The memory 610 may also include one or more other modules 614, such as a user authentication module or an access control module to secure access to the content server device(s) 108, and so forth.

The memory 610 may include the data storage 616, which may store data for operations of the content server device(s) 108. The data storage 616 may comprise a database, array, structured list, tree, or other data structure, and may be a relational or a non-relational datastore. The data storage 616 may store data such as that described above as present on the content server device(s) 108, including one or more of the response 118, the parent manifest 114, the rendition manifest(s) 116, or the content portion(s) 120. The data storage 616 may also store other data 618, such as user authentication information or access control data. In some implementations, at least a portion of the information stored in the data storage 616 may be stored externally to the content server device(s) 108, on other devices that may communicate with the content server device(s) 108 via the I/O interface(s) 606 or via the network interface(s) 608.

Figure 7:
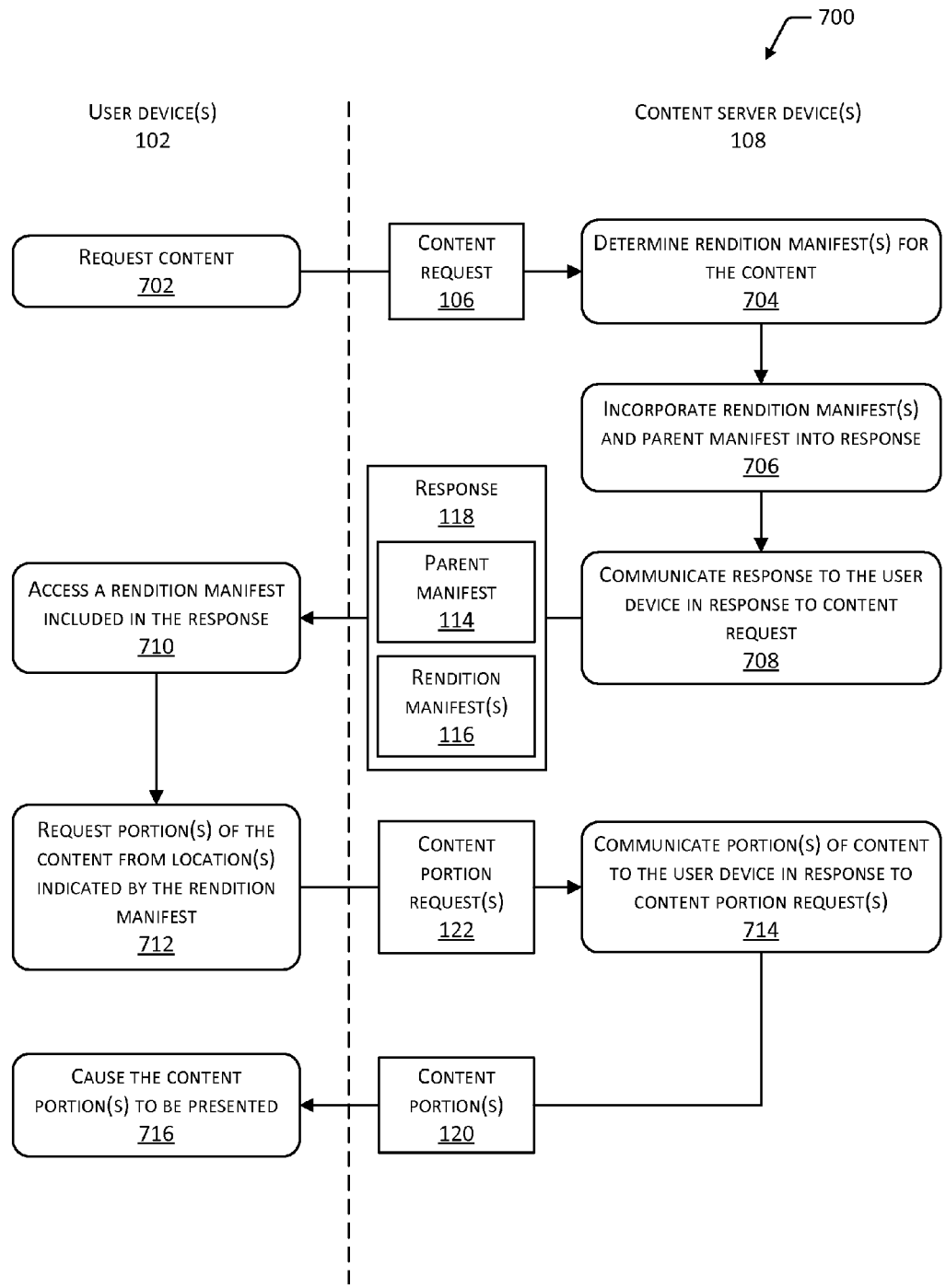
FIG. 7 depicts a flow diagram of a process for providing content to present on a user device by including a parent manifest and one or more rendition manifests in a response.

FIG. 7 depicts a flow diagram 700 of a process for providing content to present on a user device 102 through a response 118 that includes one or more rendition manifests 116. Operations of the process may be performed by the content presentation module 104, the other module(s) 514 executing on the user device 102, the content service module(s) 110, the manifest processing module 112, the content stitching module 124, the other module(s) 614 executing on the content server device(s) 108, or other modules executing on other devices.

At 702, a particular content file or stream may be requested on the user device 102 to generate a content request 106. In some cases, the content may be requested via a user entering a URL for the content in a web browser to instruct the web browser to present the content through the content presentation module 104.

At 704, one or more rendition manifests 116 may be determined for the requested content. In some cases, the rendition manifests 116 may be stored in rendition manifest files on the content server device(s) 108 or elsewhere. In such cases, the rendition manifest files may be accessed at 704 to retrieve the rendition manifest(s) 116. Alternatively, the rendition manifest(s) 116 may be generated, at least in part, dynamically in response to the receipt of the content request 106.

At 706, the contents of one or more rendition manifests 116 may be embedded in the response 118 as Data URI(s), JSON object(s), images, or through other methods. In some cases, all the rendition manifests 116 for the requested content may be incorporated into the response 118. For example, video content may be encoded in chunks for seven different bit rates 202, and each of the seven rendition manifests 116 describing the portion locations 206 of the variously encoded chunks may be incorporated into the response 118. The parent manifest 114 may also be incorporated into the response 118. As described with reference to FIGS. 2-4, the parent manifest 114 may be modified to include, instead of network location(s) of rendition manifest(s) 116, internal reference(s) 204 to data object(s) that include the contents of rendition manifest(s) 116.

In some cases, a subset of the rendition manifests 116 may be incorporated into the response 118. For example, the rendition manifest 116 associated with a bit rate 202 for current network conditions may be embedded into the response 118 as a Data URI or other type of data object, and the rendition manifests 116 for other bit rates 202 may be referenced as URLs in the parent manifest 114. In this way, implementations may facilitate access to the rendition manifest 116 that is likely to be employed by the content presentation module 104. In some cases, the rendition manifests 116 for the bit rates 202 immediately higher and lower than that of the current network conditions may also be embedded in the response 118. In some implementations, the determination of which rendition manifests 116 to embed in the parent manifest 114 may be based at least in part on other information, such as characteristics of the user device 102, characteristics of the content presentation module 104, or information regarding the current user of the user device 102. Such other information may be included in the content request 106 as header information (e.g., a user-agent header), parameters, cookies, and so forth.

At 708, the response 118 including the parent manifest 114 and one or more embedded rendition manifests 116 may be communicated to the user device 102 in response to the content request 106.

At 710, the web browser or another module executing on the user device 102 may select or otherwise access one of the rendition manifests 116. In some cases, the selected rendition manifest 116 may correspond to the bit rate 202 for current network conditions, such as a speed or quality of the network connection between the user device 102 and the content server device(s) 108 serving the content portion(s) 120.

At 712, the content presentation module 104 may execute and begin requesting the content portion(s) 120 from the portion location(s) 206 listed in the selected rendition manifest 116. One or more content portion requests 122 may be generated and sent to the portion location(s) 206 to request the content portion(s) 120.

At 714, the content portion(s) 120 may be communicated to the user device 102 in response to the content portion request(s) 122.

At 716, the content presentation module 104 may cause the received content portion(s) 120 to be presented on a presentation device associated with the user device 102.

Figure 8:
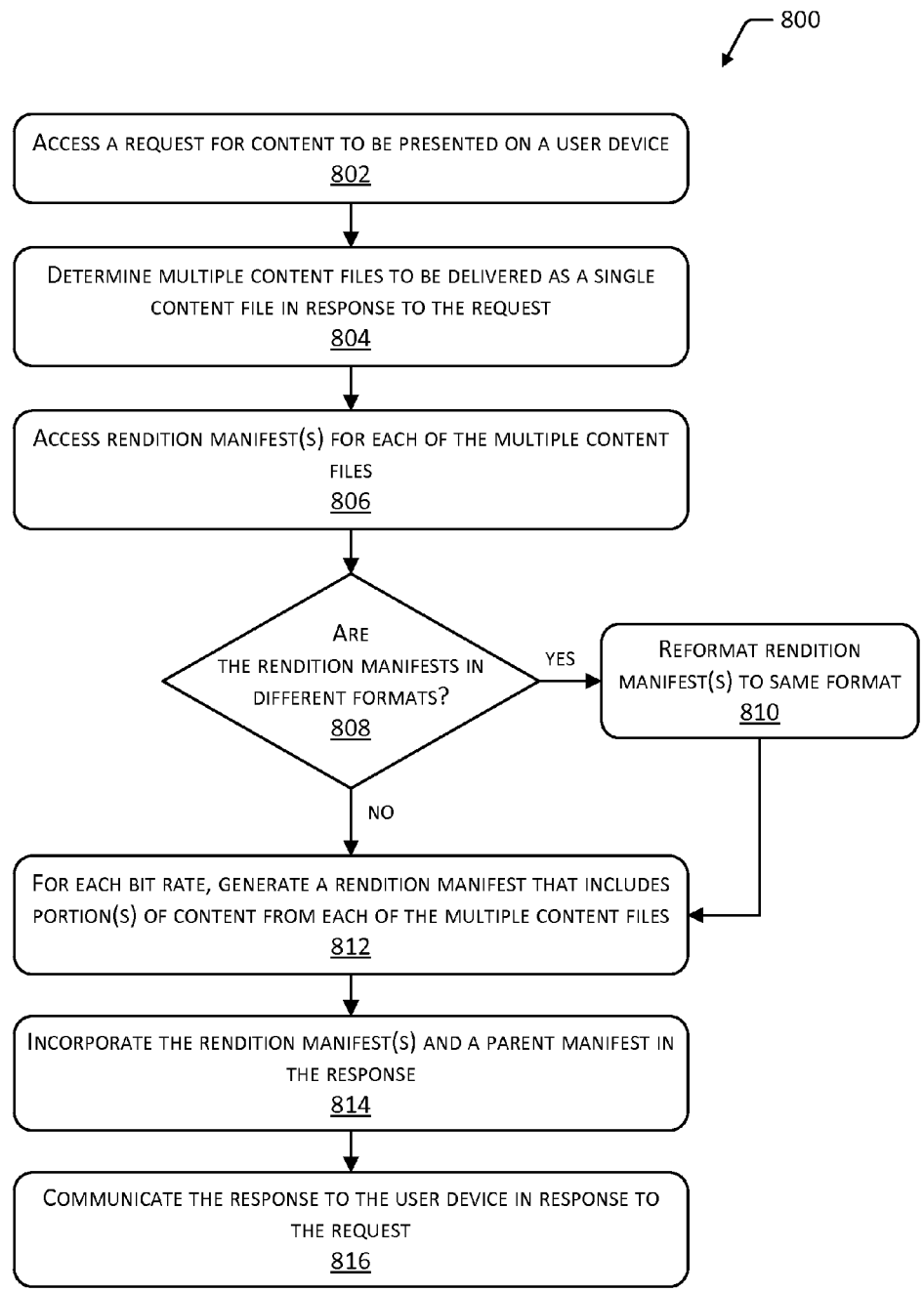
FIG. 8 depicts a flow diagram of a process for generating rendition manifests that describe locations of portions of content from multiple content files.

FIG. 8 depicts a flow diagram 800 of a process for generating rendition manifest(s) 116 that describe portion locations 206 of content portions 120 from multiple content files, as described above with reference to FIG. 3. Operations of the process may be performed by the content service module(s) 110, the manifest processing module 112, the content stitching module 124, the other module(s) 614 executing on the content server device(s) 108, or other modules executing on other devices.

At 802, the content request 106 may be received or otherwise accessed on the content server device(s) 108.

At 804, a determination may be made that multiple content files are to be delivered to the user device 102 and presented in response to the content request 106. As described above with reference to FIG. 3, the multiple constituent content files may be stitched together such that the content presentation module 104 or the web browser on the user device 102 may interpret the delivered content as a single content file.

At 806, the rendition manifests 116 for each of the constituent content files may be accessed. For example, the rendition manifests 116 may be in multiple rendition manifest files stored on the content server device(s) 108 or elsewhere, and the rendition manifest files may be read to access the rendition manifests 116.

At 808, a determination is made whether the rendition manifests 116 for the constituent content files are arranged according to different formats. For example, one or more of the rendition manifests 116 may be formatted according to a version of HLS, and one or more other rendition manifests 116 may be formatted according to a version of MPEG-DASH or some other format for video manifest files. If the rendition manifests 116 are all arranged according to a same format, the process may proceed to 812. If any of the rendition manifests 116 are arranged in different formats, the process may proceed to 810 and reformat the rendition manifest(s) 116 to a same format. For example, non-HLS formatted rendition manifest(s) 116 may be reformatted to comply with a version of HLS. Such reformatting may include modifying the description of the portion location(s) 206 or other data in the rendition manifest(s) 116 to comply with a common format. The process may then proceed to 812.

At 812, for each bit rate 202 to be included in the parent manifest 114 sent to the user device 102, a rendition manifest 116 may be generated to include the portion locations 206 of the content portions 120 from each of the multiple constituent content files. The portion locations 206 may be extracted from the rendition manifests 116 for the corresponding bit rate 202, and included in the generated rendition manifest 116 in an order in which the constituent content files are to be presented. For example, a first constituent content file may be an advertisement and a second constituent content file may be primary content such as a film, television episode, movie trailer, and so forth. In such cases, the portion locations 206 for the advertisement may be listed in the rendition manifest 116 prior to the portion locations 206 for the primary content.

At 814, one or more of the rendition manifests 116 may be incorporated into the response 118 with the parent manifest 114 as described above.

At 816, the response 118 may be communicated to the user device 102.

Figure 9:
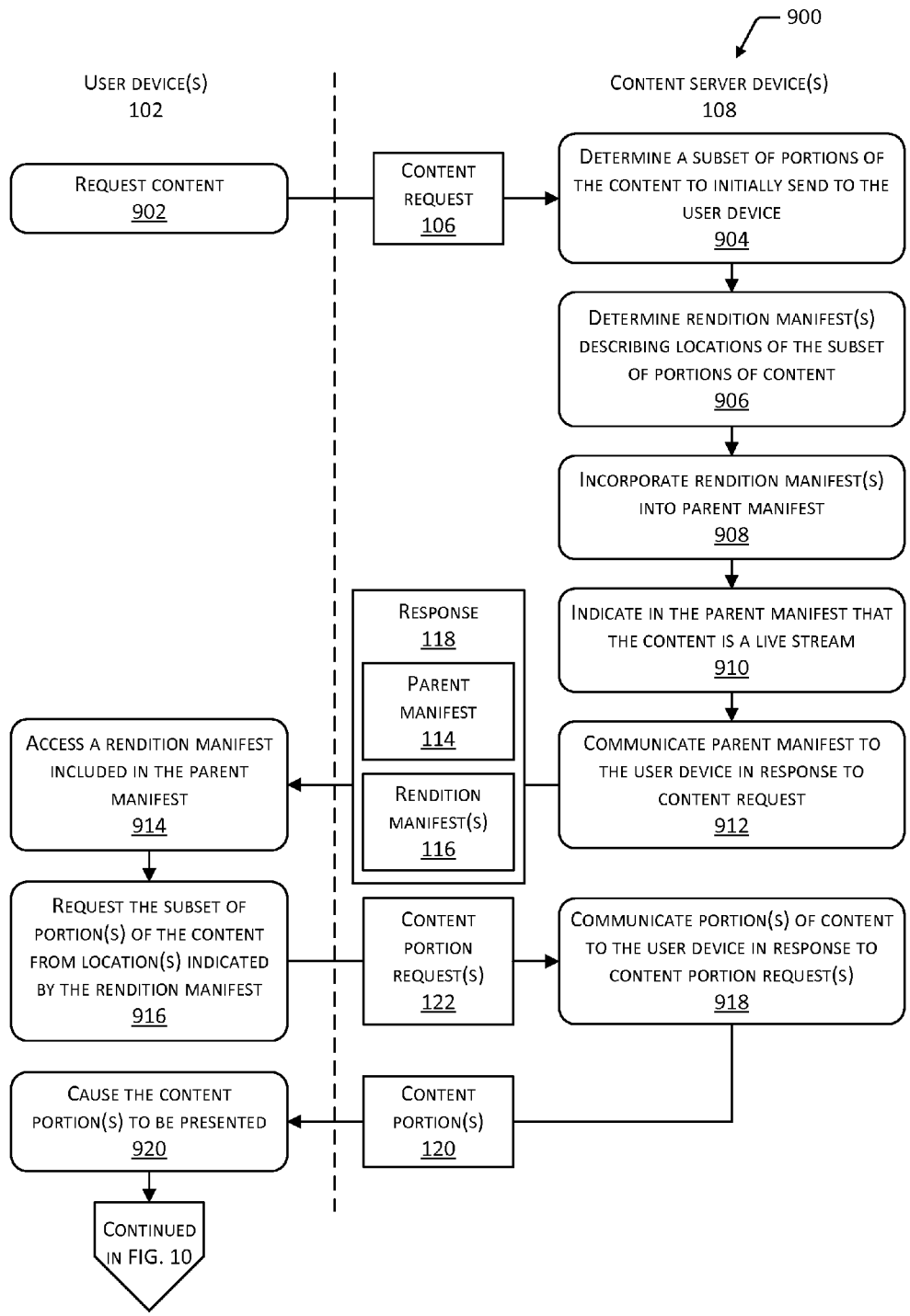
FIG. 9 depicts a flow diagram of a process for providing content to present on a user device by including a parent manifest and one or more rendition manifests in a response, in which the parent manifest indicates a live stream, and each rendition manifest describes locations of a subset of portions of playable content of a content file.
Figure 10:
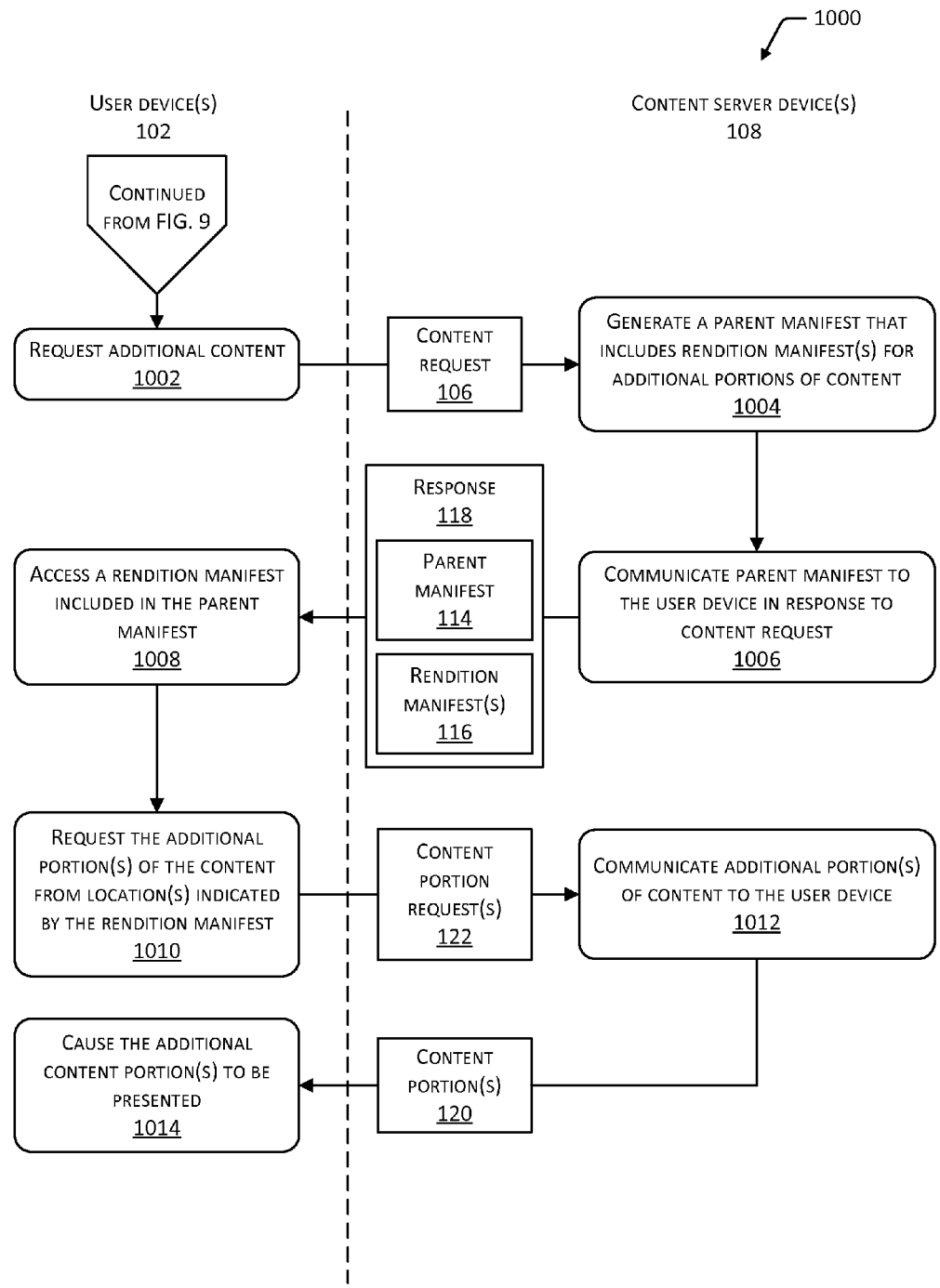
FIG. 10 depicts a flow diagram of a continuation of the process for providing content to present on a user device by including a parent manifest and one or more rendition manifests in a response, in which the parent manifest indicates a live stream, and each rendition manifest describes locations of a subset of portions of playable content of a content file.

FIGS. 9 and 10 depict flow diagrams 900 and 1000 of a process for providing content to present on a user device 102 through a response 118 that includes inline the contents of one or more rendition manifests 116. As described above with reference to FIG. 4, the parent manifest 114 or the rendition manifest(s) 116 may include a live stream indicator 402 that indicates a live stream, and each rendition manifest 116 may describe portion locations 206 of a subset of the content portions 120 of a content file. Operations of the process may be performed by the content presentation module 104, the other module(s) 514 executing on the user device 102, the content service module(s) 110, the manifest processing module 112, the content stitching module 124, the other module(s) 614 executing on the content server device(s) 108, or other modules executing on other devices.

At 902, a web browser or other module executing on the user device 102 may generate and send the content request 106 to the content server device(s) 108, as described above with reference to 702.

At 904, a determination may be made of a subset of content portions 120 of the requested content file to initially send to the user device 102 in response to the content request 106. In some cases, the determination of the number of content portions 120 to initially provide may be based on a quality of service metric. For example, a quality of service metric may indicate that the content is to begin playing on the user device 102 within two seconds of the sending of the content request 106. The number of content portions 120 may be determined such that the latency of the generation and communication of the parent manifest 114 enables playback to begin within two seconds given the current network speed.

At 906, the rendition manifest(s) 116 are determined that describe the portion locations 206 of the subset of content portions 120 determined at 904.

At 908, the rendition manifest(s) 116 are incorporated into the response 118 as described above.

At 910, the rendition manifest(s) 116 or the parent manifest 114 may be modified to include the live stream indicator 402 indicating that the content is live content. The live stream indicator 402 may indicate to the content presentation module 104 that it is to begin presenting the content portion(s) 120 even though it may not have received all the content portions 120 of the content file. The rendition manifest(s) 116 may also omit an end tag, duration, or other information indicating an end of the content file.

At 912, the response 118 including the parent manifest 114 and the rendition manifest(s) 116 is communicated to the user device 102.

At 914, the web browser or another module executing on the user device 102 may select or otherwise access one of the rendition manifests 116 as described with reference to 710.

At 916, the content presentation module 104 may execute and begin requesting the subset of content portion(s) 120 from the portion location(s) 206 listed in the selected rendition manifest 116. One or more content portion requests 122 may be generated and sent to the portion location(s) 206 to request the content portion(s) 120.

At 918, the subset of content portion(s) 120 may be communicated to the user device 102 in response to the content portion request(s) 122.

At 920, the content presentation module 104 may cause the received content portion(s) 120 to be presented on a presentation device associated with the user device 102. The process may then proceed as described with reference to FIG. 10.

At 1002, after at least some of the initial subset of content portion(s) 120 are presented, the content presentation module 104 may request additional content via an additional content request 106.

At 1004, the additional content request 106 may be received and another response 118 may be generated that includes a parent manifest 114 and rendition manifest(s) 116 for additional content portions 120.

At 1006, the response 118 may be communicated to the user device 102 in response to the additional content request 106.

At 1008, the web browser or another module executing on the user device 102 may select or otherwise access one of the rendition manifests 116 as described with reference to 710.

At 1010, the content presentation module 104 may request the additional content portion(s) 120 from the portion location(s) 206 listed in the selected rendition manifest 116. One or more content portion requests 122 may be generated and sent to the portion location(s) 206 to request the additional content portion(s) 120.

At 1012, the additional content portion(s) 120 may be communicated to the user device 102 in response to the content portion request(s) 122 sent at 1010.

At 1014, the content presentation module 104 may cause the received additional content portion(s) 120 to be presented on a presentation device associated with the user device 102. The process may continue as the content presentation module 104 sends subsequent requests for content portions 120 and causes subsequently received content portions 120 to be presented. In this way, the content presentation module 104 may treat the content as a live stream even in cases where the complete content file is available at the time of the initial content request 106. By delivering the content as a live stream, implementations may reduce the size of the response 118 by reducing the size of the rendition manifest(s) 116 embedded in the response 118, thus reducing the delay prior to the start of content presentation on the user device 102.

Although the above examples may describe indicating content as a live stream according to HLS, implementations support other methods for live streaming of content such as Real Time Messaging Protocol (RTMP)™ provided by Adobe Systems of San Jose, Calif., United States. Implementations support techniques in which an open connection is maintained between the user device 102 and the content server device(s) 108, such as the maintenance of an open communications socket, long polling, and so forth.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
generating a first request for video content meeting a quality of service metric to be presented on a presentation device associated with a user device;
receiving a response to the first request, the response including a parent manifest and a plurality of rendition manifests associated with a number of content portions that meet the quality of service metric, the parent manifest including references to data of the plurality of rendition manifests, the plurality of rendition manifests including a selected first portion of the plurality of rendition manifests reformatted to a format of a second portion of the plurality of rendition manifests to provide the plurality of rendition manifests with a same format, the data associated with the first portion of the plurality of rendition manifests is modified to comply with the format of the second portion of the plurality of rendition manifests;

accessing the plurality of rendition manifests to identify portion locations of content portions of the video content, the portion locations arranged in an order the content portions of the video content are to be presented;

generating a second request to receive, from one of network locations described in the plurality of rendition manifests, the content portions of the video content in the order to be presented;

receiving the content portions of the video content; and causing the content portions of the video content to be presented on the presentation device associated with the user device.

2. The method of claim 1, wherein:
the data of the plurality of rendition manifests are included in a response as serialized data objects; and
the portion locations of the content portions of the video content include markup language references to the serialized data objects in the response.

3. The method of claim 1, wherein:
the video content includes first video content and second video content; and
the plurality of rendition manifests describe the network locations of:
  a first set of the content portions of the first video content; and
  a second set of the content portions of the second video content.

4. The method of claim 3, wherein:
the first video content is an advertisement; and
the second video content is not an advertisement.

5. The method of claim 1, wherein:
the plurality of rendition manifests indicates that the video content is a live stream; and
the plurality of rendition manifests describe the network locations of a subset of the content portions of the video content.

6. A system, comprising:
at least one computing device to implement one or more services, the one or more services to:
  access a first request for video content meeting a quality of service metric to be presented on a presentation device associated with a user device;
  identify a plurality of rendition manifests associated with a number of content portions that meet the quality of service metric to send in response to the first request for the video content;
  determine from the plurality of rendition manifests a first portion of the plurality of rendition manifests having a format different from a second portion of the plurality of rendition manifests;
  reformat the first portion of rendition manifests to provide the first portion of rendition manifests and the second portion of rendition manifests with a same format;
  modify data associated with the first portion of the plurality of rendition manifests to comply with the same format of the second portion of the plurality of rendition manifests;
  arrange portion locations of content portions of the video content in the plurality of rendition manifests in an order the content portions are to be presented;
  incorporate, into a response to the first request, a parent manifest and the plurality of rendition manifests;
  communicate the response to the user device;
  access a second request for the content portions of the video content identified by the portion locations in the plurality of rendition manifests; and
  in response to the second request, communicate the content portions of the video content to the user device.

7. The system of claim 6, wherein:
the plurality of rendition manifests are incorporated into the response to the first request as serialized data objects, wherein
the parent manifest includes a reference to the serialized data objects in the response.

8. The system of claim 6, wherein the plurality of rendition manifests are configured according to a version of Hypertext Transfer Protocol Live Streaming (HLS) protocol.

9. The system of claim 6, the one or more services further configured to:
determine a first set of portions of first video content, the first set of portions described in a first of the plurality of rendition manifests for the first video content;
determine a second set of portions of second video content, the second set of portions described in a second of the plurality of rendition manifests for the second video content; and
generate the plurality of rendition manifests to describe locations of the first set of portions and the second set of portions.

10. The system of claim 9, wherein:
the first video content is an advertisement; and
the second video content is not an advertisement.

11. The system of claim 9, wherein:
the first of the plurality of rendition manifests and the second of the plurality of rendition manifests are configured according to a first protocol.

12. The system of claim 6, wherein:
the plurality of rendition manifests include a first rendition manifest;
the first rendition manifest indicates that the video content is a live stream; and
the one or more services are further configured to:
  determine a subset of the content portions of the video content;
  generate the first rendition manifest to describe the portion locations of the subset of the content portions of the video content; and
  communicate, to the user device, a second rendition manifest in response to a third request for the video content, the second rendition manifest describing the portion locations of one or more additional portions of the video content not included in the subset of the content portions of the video content.

13. The system of claim 6, wherein:
the plurality of rendition manifests include a first rendition manifest; and
the parent manifest further includes a network location of a second rendition manifest.

14. One or more non-transitory computer-readable media storing instructions which, when executed by at least one processor, instruct the at least one processor to perform actions comprising:
generating a request for content meeting a quality of service metric to be presented on a presentation device associated with a user device;

accessing, at the user device, a response to the request, the response including data objects comprising a parent manifest and a plurality of rendition manifests describing portion locations of content portions in an order the content portions are to be presented, the plurality of rendition manifests associated with a number of content portions that meet the quality of service metric, the parent manifest including references to data of the plurality of rendition manifests, the plurality of rendition manifests including a selected first portion of the plurality of rendition manifests reformatted to a format of a second portion of the plurality of rendition manifests to provide the plurality of rendition manifests with a same format;

generating a second request to receive, from one of network locations described in the plurality of rendition manifests, the content portions of the video content in the order to be presented;

receiving the content portions of the video content; and causing the content portions to be presented on the presentation device associated with the user device.

15. The one or more non-transitory computer-readable media of claim 14, wherein the content includes one or more of audio content or video content.

16. The one or more non-transitory computer-readable media of claim 14, wherein:

the parent manifest includes a reference to the data objects included in the response.

17. The one or more non-transitory computer-readable media of claim 14, wherein:

the request is a first request; and accessing the content portions further includes generating a second request to receive the content portions from a network location described in the plurality of rendition manifests.

18. The one or more non-transitory computer-readable media of claim 14, wherein:

the parent manifest includes a reference to the data objects included in the response;

the data objects include a first data object; and the content portions are included in the response as a second data object.

19. The one or more non-transitory computer-readable media of claim 18, wherein:

the reference is a first reference; and the first data object of the plurality of rendition manifests include a second reference to the second data object that includes the content portions.

20. The one or more non-transitory computer-readable media of claim 14, wherein the plurality of rendition manifests are configured according to a version of Hypertext Transfer Protocol Live Streaming (HLS) protocol.

* * * * *